March 14, 1944.   A. C. RUGE   2,344,173
SWITCH
Filed March 11, 1942   3 Sheets-Sheet 1
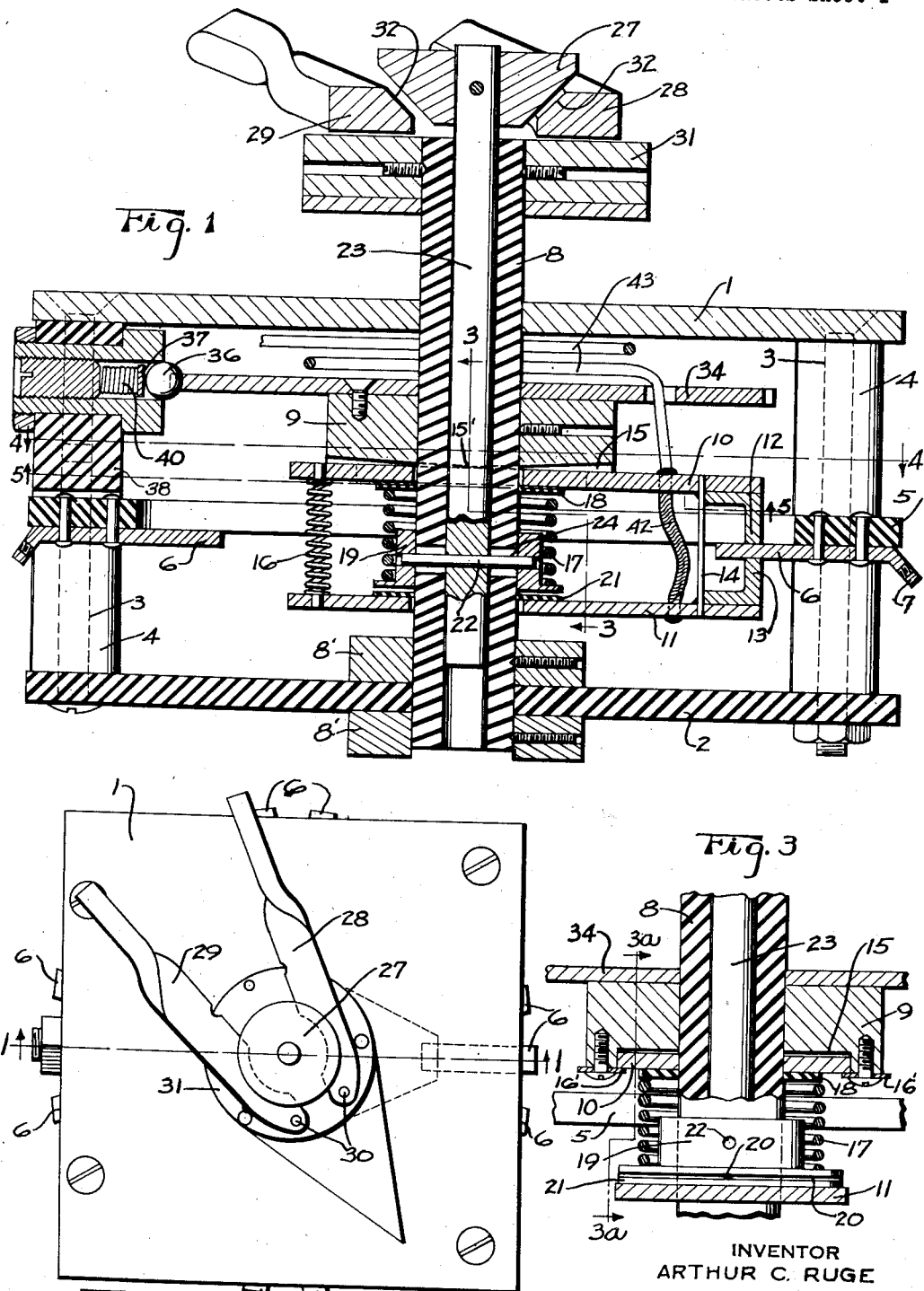
INVENTOR
ARTHUR C. RUGE
BY
ATTORNEY March 14, 1944.  A. C. RUGE  2,344,173
SWITCH
Filed March 11, 1942  3 Sheets-Sheet 2
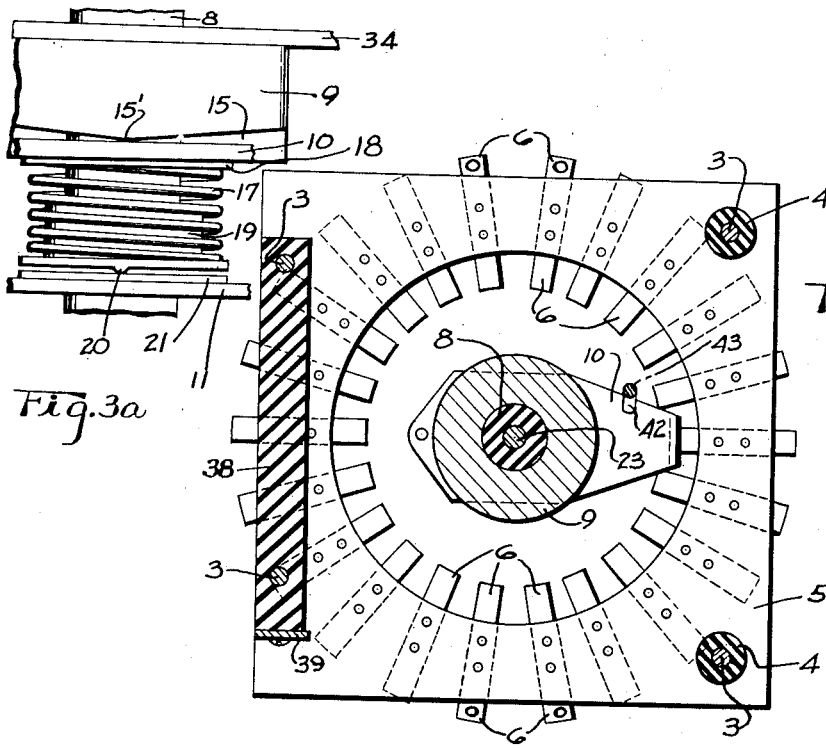
Fig. 3a
Fig. 4
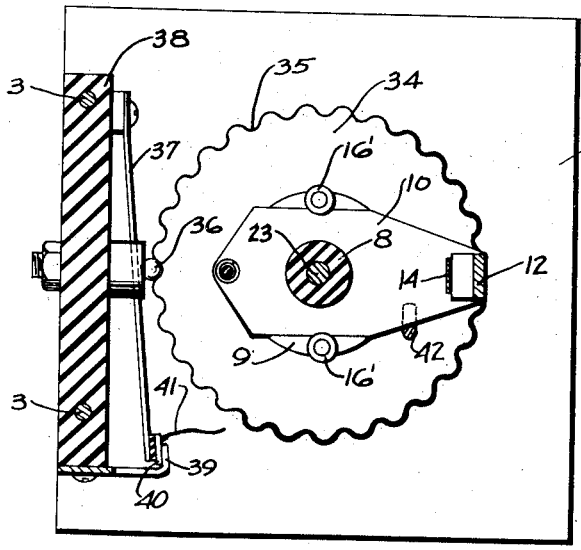
Fig. 5
INVENTOR
ARTHUR C. RUGE
BY
ATTORNEY March 14, 1944.    A. C. RUGE    2,344,173
SWITCH
Filed March 11, 1942    3 Sheets-Sheet 3

INVENTOR
ARTHUR C. RUGE
BY
ATTORNEY

Patented Mar. 14, 1944

2,344,173

UNITED STATES PATENT OFFICE 2,344,173

SWITCH

Arthur C. Ruge, Cambridge, Mass.

Application March 11, 1942, Serial No. 434,179

9 Claims. (Cl. 200—11)

This invention relates generally to electric switches and more particularly to a switch having a plurality of selective switching positions.

It is highly desirable in the use of a multiple switching apparatus to establish a thoroughly reliable electrical contact for each switching position, this usually being accomplished merely by exerting considerable mechanical pressure on the contacts although this has the serious disadvantage of requiring appreciable manual force to open and close the successive switches. This is particularly bothersome when it is desired to selectively operate the switches with reasonable rapidity as is the case in some classes of work. For example, a strain gauge has been developed in which a metallic filament is bonded throughout its length to a test specimen or member, the electrical resistance of the filament varying in accordance with its strain. Strain gauges of this type can be easily applied in large numbers to a given structure to determine not only the strain characteristics of the test member at any given point thereon, but also to determine the stress distribution over a wide area under actual operating conditions. Under such circumstances, it is desirable to successively connect the strain gauges to a recording or indicating apparatus such as a Wheatstone bridge or an oscillograph, but due to the sensitivity of this type of gauge a very effective electrical switch contact is desired and also because of the large number of gauges to be successively connected it is desirable to have a switching apparatus that can be manipulated easily, quickly and accurately. Such a desirable type of switch has, of course, many other applications and fields of use.

It is an object of my invention to provide an improved multiple switching apparatus adapted to produce a relatively heavy contact pressure and yet permit the switch to be selectively positioned with ease, dispatch and accuracy.

Another object is to provide an improved multiple switch of the foregoing type further adapted to effect cleaning of the contact surfaces in a simple, direct and expeditious manner.

A further object is to provide an improved switch that is particularly adapted for cooperation with a Wheatstone bridge or other circuits in which it is desired to automatically disconnect a given element or a sensitive instrument such as a galvanometer when shifting from one switching position to another.

A still further object is to provide an improved multiple switching unit that is economical in construction, operation and maintenance and is sufficiently simple in its structure and operation that a large number of selective contacts may be employed in a relatively compact space while still retaining the desired qualities heretofore mentioned.

Other objects and advantages will be more apparent to those skilled in the art from the following description of the accompanying drawings in which:

Fig. 1 is an enlarged transverse section of my improved switch taken substantially on the line 1—1 of Fig. 2;

Fig. 2 is a plan view of Fig. 1 on a reduced scale;

Fig. 3 is an enlarged fragmentary section taken on the line 3—3 of Fig. 1;

Fig. 3a is a fragmentary side view of Fig. 3 taken substantially on the line 3a—3a of Fig. 3;

Fig. 4 is a horizontal section taken substantially on the line 4—4 of Fig. 1;

Fig. 5 is a horizontal section taken substantially on the line 5—5 of Fig. 1;

Figure 6:
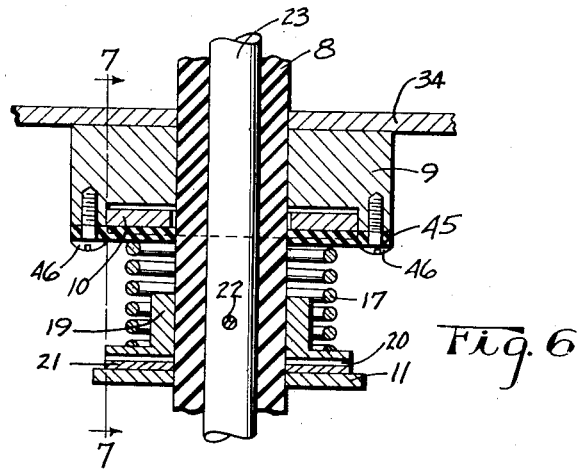
Fig. 6 is a fragmentary sectional view of a modified arrangement for applying the main spring pressure to the contacts, this section being somewhat similar to Fig. 3 with certain parts omitted and taken substantially on the line 6—6 of Fig. 7.

In the drawings, I have shown in one embodiment of the invention for purposes of illustration a pair of upper and lower frame plates 1 and 2 tied together by bolts and sleeves 3 and 4 respectively, the sleeves being split approximately midway of their length to support a stationary contact ring 5. Suitably secured by rivets or otherwise to this contact ring are a series of radial metal contacts 6 whose inner ends, as shown in Fig. 1, are flat and whose outer ends 7 may, if desired, be turned downwardly to facilitate fastening leads thereto. Journalled in the upper and lower plates 1 and 2 is a hollow shaft 8 to which is rigidly attached a collar 9, this collar supporting what I term a "clothespin" switch consisting of upper and lower switch arms 10 and 11 respectively having opposed contact points 12 and 13 cooperating with the upper and lower surfaces of contacts 6 by clamping the same. The shaft 8 is held in its axial position by collars 8' on each side of plate 2 and this shaft may be of any suitable insulation material or may be of metal suitably insulated from arms 10 and 11.

The arms 10 and 11 have suitable openings through which shaft 8 slightly loosely extends, the arms being pivotally held together near their contact ends by a relatively light, preferably flat flexible fulcrum strip of metal 14 soldered or otherwise secured to the arms. Thus it is seen that if the outer left end of these arms are moved axially away or toward each other the flexible strip will act as a fulcrum for the two arms thus either relieving pressure on the contacts 12 and 13 or increasing the pressure thereon. The arms 10 and 11 have the foregoing freedom of clamping action while still maintaining an operating connection with shaft 8 sufficient to rotatably shift the arms from one contact 6 to another, this being accomplished by supporting the upper arm 10 in a recess 15 on collar 9 as shown in Fig. 3. The recess 15 is slightly tapered from each side toward the center to provide a fulcrum 15' transversely of the recess to allow rocking of the arm. A pair of keeper washers 16' are secured to collar 9 at substantially diametric points, Fig. 5, to prevent arm 10 from falling out of its recess. The arm 10 can thus tilt or pivot about the fulcrum 15' while the straight sides of the recess permit collar 9 to rotate arms 10. The lower arm 11 is dependently supported from arm 10 by the fulcrum strip 14.

To maintain continuously a light wiping pressure on the contacts when shifting from one set of contacts 6 to another, I provide a compression spring 16 between the outer ends of arms 10 and 11, this spring exerting a light clamping force on the contacts and being of any desired tension in accordance with the degree of wiping pressure desired. In combination with the foregoing wiping pressure means, I employ additional means for exerting a very large final clamping pressure on the contacts. This is accomplished by a relatively heavy spring 17 bearing at its upper end against arm 10 through a suitable insulating washer 18 and its lower end bearing against an axially shiftable flanged collar 19 which has, as shown in Fig. 3, a radially extending fulcrum projection 20 on its lower side seated on an insulation disc 21 which rests on the top surface of arm 11. When this spring is free to act it exerts its full spring pressure against the two arms tending to spread their outer ends apart and to pinch their contacts 12 and 13 firmly against contact 6. The fulcrum plate 14 by being positioned very close to the contacts 12 and 13 provides a very large leverage arm for the force of spring 17.

In shifting switch arms 10 and 11 from one contact 6 to another, it is desirable to relieve the strong clamping pressure and yet maintain the relatively light wiping pressure of spring 16. To accomplish this and at the same time rotate arms 10 and 11, I connect collar 19 by a pin 22 to a shaft 23, the pin being firmly secured in shaft 23 and extending through an axially elongated slot 24 in the insulated shaft 8. The upper end of shaft 23 has a cam collar 27 while a pair of combined cam and switch rotating levers 28 and 29, Figs. 1 and 2, are pivotally secured at 30 to a collar 31 which, in turn, is rigidly connected to the insulated shaft 8.

To operate the switch, the operator presses the outer ends of levers 28 and 29 together whereupon the inclined surface 32 of the levers, Fig. 1, engages the correspondingly tapered surface of collar 27 to raise the same together with shaft 23, pin 22 and collar 19 thereby relieving the downward large pressure of spring 24 on switch arm 11. The only pressure now inserted on arm 11 is that of spring 16 and the reaction of this spring on the upper arm 10 causes the switch contacts 12 and 13 to have a light wiping pressure on contact 6. Hand levers 28 and 29 can now be rotated as a unit thus rotating the shaft 8 and contact arms 10 and 11 by reason of arm 10 being located in the straight sided recess 15 which transmits torque from collar 9 to arm 10.

To determine when the contact arms 10 and 11 are in alignment with any one of selected switch contacts 6, I provide a disc 34, Figs. 1 and 5, having a series of recesses 35 angularly spaced to correspond with the angular spacing of stationary contacts 6. A spring pressed ball 36 engaged the successive recesses 35 thereby providing a ball and detent control for automatically bringing the movable contacts 13 and 15 into alignment with the selected stationary contact 6.

I further utilize the foregoing ball and detent in cooperation with the selecting operation to control any suitable auxiliary device or devices that may be used in conjunction with the switch. Under certain circumstances, it may be desired either to connect or to disconnect such auxiliary device or devices when shifting from one switching position to another. If the auxiliary device is disconnected it may be for the purpose to avoid subjecting the device to certain electrical changes that might exist between different switching positions or under certain circumstances, it may be desired to disconnect one auxiliary device and to connect another one momentarily when shifting the main switch such as in counting apparatus. If a Wheatstone bridge is employed with a galvanometer connected across the bridge it is desired not to subject the galvanometer to an unnecessary number of violent changes as might be the case if the galvanometer were continuously connected. To overcome this possibility, I provide a flexible switch arm 37, Fig. 5, having one of its ends secured to an insulation block 38 and its other end overlapping a stationary contact 39. This switch arm, as shown in Fig. 1, extends between ball 36 and spring 40 thus permitting the ball to press the switch arm 37 away from its contact 39 when the hand levers 28 and 29 initially rotate the switch arms 10 and 11. When the switch arms 10 and 11 are in proper alignment with the selected contact 6 the ball 36 automatically drops into its recess 35 and simultaneously causes switch arm 37 to engage contact 39. The switches 37 and 39 are normally placed in series with the galvanometer or other electrical device so that the circuit involved is opened or closed or switched as may be desired when the main switch is rotated. The arm 37 may be provided with one or a plurality of insulated contact points such as 40, Fig. 5, to which flexible leads 41 may be connected. Also, the two main switch arms 10 and 11 may be connected by a flexible connector 42, Fig. 1, in turn connected by a flexible lead-in coil 42 surrounding the shaft to allow free rotation thereof while maintaining the electrical connection. To insure very low and constant contact resistance all contact surfaces may be of sterling silver or other suitable material. Also the main switch may be either a shorting or non-shorting type. As shown, the contacts 12 and 15 bridge over from one contact 6 to the other during rotation but they may be sufficiently spaced and filled with insulation between them so that the movable contacts cannot bridge adjacent contacts.

Figure 7:
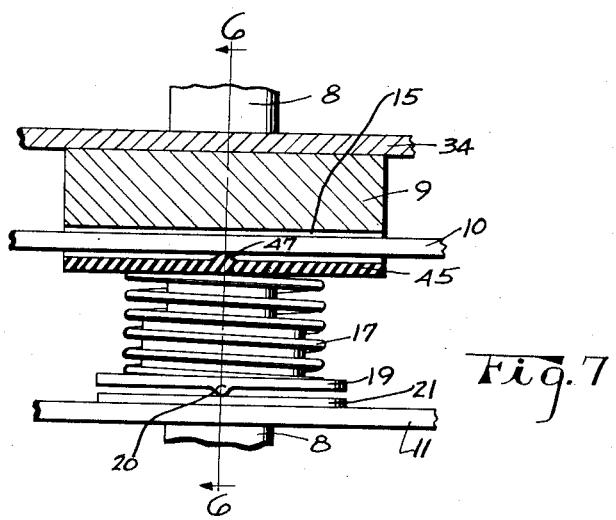
Fig. 7 is a transverse section taken substantially on the line 7—7 of Fig. 6.

In the modification shown in Figs. 6 and 7, the pressure of main spring 17 may be removed entirely from the upper contact arm 10 during rotation of the switch. This is accomplished by providing a combined keeper and fulcrum plate 45 secured to collar 9 by screws 46, the plate 45 taking the place of washer 18, Fig. 1, in the preferred form. As shown in Fig. 7, the plate 45 has a transverse fulcrum ridge 47 upon which the arm 10 is adapted to bear when the spring pressure is applied. The remaining structure is identical to the preferred form and hence need not be further described. In operation, upward movement of cam rod 23 lifts the collar 19 thereby to compress spring 17 against plate 45, this plate being of sufficient thickness and rigidity to resist the compression force of the spring. When the spring is thus compressed the spring pressure can no longer act either directly or indirectly on the upper arm 10 and hence the two arms 10 and 11 are under the influence of only the wiping spring 16. Under these circumstances, the wiping spring 16 causes contact arm 11 to pivot about the fulcrum plate 14 thereby holding contact 13 in engagement with contact 6 and exerting a downward force on fulcrum plate 14 which causes arm 10 to exert a downward force on its contact 12 and a downward force on fulcrum ridge 47, Fig. 7. The main spring 17 acts in an identical manner when exerting a clamping force. For instance, the main spring forces fulcrum 20 of collar 19 downwardly against contact arm 11, which, in turn, causes contact 13 to bear upwardly against contact 6 and to pull down fulcrum plate 14 which, in turn pulls upper contact arm 10 downwardly so that contact 12 bears against contact 6 and also bears on fulcrum 47. While the application of pressure to the upper arm 10 is thus somewhat reversed as compared to the preferred form, yet broadly the action in the two forms is the same in that the main spring pressure is relieved from the contacts during rotation of the switch. The modified arrangement of Figs. 6 and 7 allows the main spring 17 to have substantial eccentricity without affecting the clamping section of the switch contacts 12 and 13 during rotation thereof, whereas in the preferred form of Fig. 1 the main spring 17 is preferably maintained with more perfect concentricity to the shaft 8 in order that the arm 10 may have complete freedom of balance on the fulcrum 15'.

From the foregoing disclosure it is seen that I have provided a very effective selective switching apparatus adapted to exert and to relieve large pressure on the switching contacts when shifting from one switching position to another but at the same time maintaining a light wiping pressure on the contacts. My improved switch accomplishes these functions in a simple, direct and positive manner and effects a high degree of coordination with an auxiliary switch such as the galvanometer switches 37 and 39 for opening the same automatically when shifting from one position to another. The switch can easily employ any number of switching positions and can be made in multiple units if desired. The switching apparatus is sturdy and is compact considering the number of switching positions available and is easily and expeditiously operable together with insuring very effective electrical connection at the contact points.

It will of course be understood that various changes in details of construction and arrangement of parts may be made by those skilled in the art without departing from the spirit of the invention as set forth in the appended claims.

I claim:

1. An electric switch having a multiplicity of switching positions, comprising a plurality of selectable contacts disposed in different positions, a cooperating contact slidably engageable with any one of said selectable contacts, means for supporting said selectable and cooperating contacts in operative relation to each other, means for exerting a clamping pressure between the selected contact and said cooperating contact, and means for reducing said clamping pressure whereby the remaining pressure provides a wiping pressure between said contacts when said cooperating contact slides from one contact to the other.

2. An electric switch comprising a stationary element having contact surfaces on its opposite sides, a pair of movable switch contacts slidably engageable with said opposite contact surfaces, means for supporting said movable contacts relative to said stationary element, and means for exerting a wiping contact pressure on said pair of contacts during movement thereof and for effecting a larger clamping pressure on said pair of contacts when said movement ceases.

3. An electric switch comprising a stationary element having contact surfaces on its opposite sides, a pair of movable switch contacts engageable with said opposite contact surfaces, means for supporting said movable contacts relative to said stationary element, means for moving said pair of contacts, means constantly operative during said movement to cause said pair of contacts to exert a wiping pressure on said stationary contact, means for exerting a final clamping pressure of said pair of contacts on said stationary contact, and means for releasing said final clamping pressure whereby said relative movement may be effected while said wiping pressure continues.

4. An electric switch comprising a switch element having contact surfaces on its opposite sides, a pair of switch arms having opposed contacts engageable with said contact surfaces, means for supporting said switch arms relative to said switch element, means for pivotally connecting said arms together, spring means interposed between said arms to pivotally urge their respective contacts toward each other thereby to effect a clamping pressure on said switch element, means for relatively moving said switch element and said pair of contacts, and means for partially relieving the action of said spring means during said relative movement whereby said pair of contacts are maintained under a wiping contact pressure during said relative movement and are subject to a final contact pressure when said movement ceases.

5. The combination set forth in claim 4 further characterized in that said pivotal means comprises a flexible strip permanently secured to said switch arms at a point near said pair of contacts, whereby said strip is adapted to flex when the contact pressure is varied upon pivotal movement of said arms.

6. An electric switch having a multiplicity of switching positions, comprising a plurality of selectable contacts arranged in different positions, a cooperating contact engageable with any one of said selectable contacts, means for supporting said cooperating contact relative to said selectable contacts, means for exerting a clamping pressure between the selected contact and said cooperating contact, and operating means for effecting relative movement between said cooperating contact and said selectable contacts and simultaneously reducing said clamping pressure but maintaining a wiping pressure between said contacts.

7. The combination set forth in claim 6 further characterized in that said operating means includes a cam and a cooperating lever adapted to engage said cam to move the same to reduce said clamping pressure and thereafter effect said relative movement between the contacts.

8. An electric switch having a multiplicity of switching positions, comprising a plurality of stationary contacts each of which has contact surfaces on its opposite sides arranged in different positions in a circular manner, a pair of rotatable switch contacts engageable with said opposite contact surfaces, a shaft operatively connected to said movable contacts for rotating the same, means for rotatably supporting said shaft relative to said stationary contacts, a main clamping spring positioned coaxially of said shaft for causing said movable contacts to exert a strong clamping action on a selected stationary contact, an auxiliary spring for exerting a wiping pressure on said movable contacts laterally offset from said main spring, and means for relieving the pressure of said main spring when said movable contacts are rotated thereby allowing said auxiliary spring to maintain a wiping pressure between said contacts.

9. The combination set forth in claim 8 further characterized in that said shaft is hollow and said means for relieving the pressure of said main spring includes a rod extending into said hollow shaft and having lateral connection with said main spring, and means for axially moving said rod to relieve said main spring pressure.

ARTHUR C. RUGE.